(12) United States Patent
McDermot et al.

(10) Patent No.: US 12,209,605 B2
(45) Date of Patent: *Jan. 28, 2025

(54) DIOPTER ADJUSTMENT MECHANISM

(71) Applicant: Sheltered Wings, Inc., Barneveld, WI (US)

(72) Inventors: Connor McDermot, Barneveld, WI (US); Alec Collins, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,188

(22) Filed: Apr. 10, 2023

(65) Prior Publication Data

US 2023/0272814 A1   Aug. 31, 2023

Related U.S. Application Data

(63) Continuation of application No. 16/893,688, filed on Jun. 5, 2020, now Pat. No. 11,624,393.
(Continued)

(51) Int. Cl.
*F41G 1/38* (2006.01)
*F16B 33/02* (2006.01)
(Continued)

(52) U.S. Cl.
CPC ............... *F16B 33/02* (2013.01); *F41G 1/38* (2013.01); *G02B 23/06* (2013.01); *G02B 23/18* (2013.01); *G02B 25/001* (2013.01)

(58) Field of Classification Search
CPC ........ G02B 7/026; G02B 7/003; G02B 7/021; G02B 7/04; G02B 7/02; G02B 7/022;
(Continued)

(56) References Cited

U.S. PATENT DOCUMENTS

| 3,560,080 A | 2/1971 | Wilcyzynksi et al. |
| 3,888,568 A | 6/1975 | Norris et al. |

(Continued)

FOREIGN PATENT DOCUMENTS

| CN | 1267796 A | 9/2000 |
| CN | 102878179 A | 1/2016 |

(Continued)

OTHER PUBLICATIONS

International Search Report and Written Opinion for International Application No. PCT/US20/36279 dated Jan. 7, 2021, 12 pages.
(Continued)

*Primary Examiner* — Michael D David
(74) *Attorney, Agent, or Firm* — Husch Blackwell LLP

(57) ABSTRACT

A diopter adjustment mechanism comprises a scope tube with a first female thread and a second female thread. The first female thread has a first pitch and is disposed on the scope tube forming a spiral thread and lands between the spiral threads. The second female thread has a second pitch and is disposed on the lands of the first female thread. A jam nut has a male thread corresponding to and engaging the second female thread. The pitch of the first female thread is greater than the pitch of the second female thread.

12 Claims, 2 Drawing Sheets

Related U.S. Application Data

(60) Provisional application No. 62/857,518, filed on Jun. 5, 2019.

(51) Int. Cl.
 *G02B 23/06* (2006.01)
 *G02B 23/18* (2006.01)
 *G02B 25/00* (2006.01)

(58) Field of Classification Search
 CPC .......... G02B 7/023; G02B 7/18; G02B 23/06;
 G02B 23/18; G02B 25/001; G02B 23/14;
 G02B 23/16; G03B 17/02; G03B 17/12;
 F16B 33/02; F41G 1/38
 USPC .................................................. 42/119–121
 See application file for complete search history.

(56) References Cited

U.S. PATENT DOCUMENTS

| | | |
|---|---|---|
| 4,733,945 A | 3/1988 | Bacich |
| 5,076,682 A | 12/1991 | Pasfield |
| 5,121,251 A | 6/1992 | Edwards |
| 5,245,478 A | 9/1993 | Luecke |
| 8,033,671 B1 | 10/2011 | Nilsen et al. |
| 9,244,245 B2 | 1/2016 | Lamontagne et al. |
| 9,939,604 B2 | 4/2018 | Lamontagne et al. |
| 10,288,095 B2 | 5/2019 | Lamontagne et al. |
| 11,320,623 B2 | 5/2022 | Savard et al. |
| 11,624,393 B2 * | 4/2023 | McDermot ............... F41G 1/38 42/119 |
| 2001/0033436 A1 | 10/2001 | Hunter |
| 2002/0021504 A1 | 2/2002 | Bayer et al. |
| 2002/0176180 A1 | 11/2002 | Ue et al. |
| 2015/0002702 A1 | 1/2015 | Hu et al. |
| 2016/0025950 A1 | 1/2016 | Lamontagne |
| 2018/0246395 A1 | 8/2018 | Kholopov et al. |
| 2020/0386259 A1 * | 12/2020 | McDermot .......... G02B 25/001 |
| 2021/0215926 A1 | 7/2021 | McDermot et al. |
| 2021/0381803 A1 | 12/2021 | McDermot |

FOREIGN PATENT DOCUMENTS

| | | |
|---|---|---|
| CN | 206930815 U | 1/2018 |
| CN | 207752221 U | 8/2018 |
| JP | 1972-012934 Y | 5/1972 |
| JP | 1980-074510 A | 6/1980 |
| JP | 2002-350704 A | 12/2002 |
| JP | 2016-211649 A | 12/2016 |
| JP | 2018-510385 A | 4/2018 |

OTHER PUBLICATIONS

European Search Report of European Patent Application No. EP20840681.9 Mailed Jun. 2, 2023, pp. 6.
Extended European Search Report issued for European Patent Application No. 20840681.9 dated Jun. 2, 2023, 6 pages.

* cited by examiner

DIOPTER ADJUSTMENT MECHANISM

CROSS-REFERENCE TO RELATED APPLICATIONS

This application is a continuation patent application of U.S. patent application Ser. No. 16/893,688 filed Jun. 5, 2020, which is a non-provisional application of and claims priority to U.S. Provisional Patent Application No. 62/857,518 filed Jun. 5, 2019, which is incorporated by reference in its entirety.

FIELD

The disclosure relates to an adjustment mechanism for a female threaded component. In one embodiment, the disclosure relates to an mechanism for a diopter adjustment.

BACKGROUND

People's vision varies greatly from person to person. Even with a given individual, there can be a difference between the right eye's and left eye's vision. Diopter adjustments are provided on viewing optics, such as rifle scopes, cameras, etc., to allow the viewing optic to be focused for each user. In some instances when a viewing optic has two eye pieces, a diopter adjustment may be provided on one or both eyepieces to allow each individual eye piece to be adjusted to a user's specific eyes as well.

There are two primary types of diopter adjustments. In a first type, the diopter adjustment has a fine thread pitch that allows a user to lock the position tight with a jam nut, but, because of the fine thread, it takes along time for the user to get to the setting they need. Because it takes so long, the user's eye can compensate while changing the focus. When looking through the viewing optic later, the user's eye is no long compensating and the diopter adjustment must be changed again.

A second type of diopter adjustment is a fast focus diopter adjustment. A fast focus diopter adjustment uses a thread with a larger pitch. As a result, adjustments can be made quickly before a user's eye can compensate. Unfortunately, because of the large pitch, it is difficult to securely lock the diopter adjustment in place, and it will self-adjust when bumped or when the gun is fired.

For the reasons discussed above, having a "zero stop" turret is a big advantage. Thus, there is a large need for a zero stop turret that can address these concerns.

SUMMARY

In one embodiment, the disclosure provides a diopter adjustment mechanism. In accordance with embodiments of the disclosure, a diopter adjustment mechanism comprises a scope tube, a first female thread having a first pitch disposed on the scope tube forming a spiral thread and lands between the spiral threads, a second female thread having a second pitch and disposed on the lands of the first female thread, and a jam nut having a male thread corresponding to and engaging the second female thread, wherein the first pitch is greater than the second pitch.

In an embodiment the first female thread is trapezoidal. In an embodiment the second female thread has a V-thread profile. In another embodiment, the first pitch is from 2.5× to 5× the second pitch. In a further embodiment, the first pitch is from 3.0 mm to 6.0 mm. In yet a further embodiment, the second pitch is from 0.25 mm to 2.5 mm. In another embodiment, the thread angle of the first female thread is from 20° to 45°. In another embodiment, the thread angle of the second female thread is from 40° to 80°.

In another embodiment, the disclosure provides a viewing optic. In accordance with embodiments of the present disclosure, a viewing optic comprises an eyepiece having an inner surface having a first male thread; a scope tube having an outer surface with a first female thread and a second female thread, the first female thread having a first pitch and lands and the second female thread having a second pitch and disposed on the lands; and a jam nut rotationally secured to the outer surface of the scope tube and having a second male thread on an inner surface, wherein the first pitch is greater than the second pitch, wherein the first male thread corresponds to the first female thread, and wherein the second male thread corresponds to the second female thread.

In another embodiment, the first female thread is trapezoidal. In yet another embodiment, the second female thread has a V-thread profile. In a further embodiment, the first pitch is from 2.5× to 5× the second pitch. In yet a further embodiment, the first pitch is from 3.0 mm to 6.0 mm. In still another embodiment, the second pitch is from 0.25 mm to 2.5 mm. In another embodiment, the thread angle of the first female thread is from 20° to 45°. In still another embodiment, the thread angle of the second female thread is from 40° to 80°. In still a further embodiment, the viewing optic is selected from a scope, a rifle scope, binoculars, a camera, and a telescope. In another embodiment, the viewing optic is adapted for use with a firearm.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings.

Figure 1:
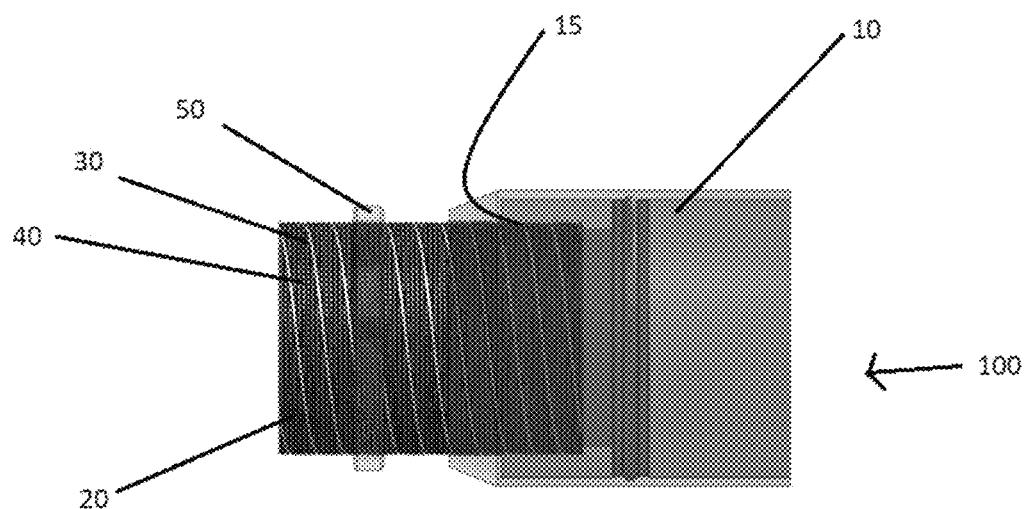
FIG. 1 is a partial side view of a diopter adjustment mechanism in accordance with embodiments of the present disclosure.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on", "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, temperature etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the description.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. In one embodiment, the viewing optic is a riflescope. The term "viewing optic" is used interchangeably with "optic sight."

As used herein, "pitch" refers to the distance between screw threads.

As used herein, "land" refers to the portion between screw threads.

FIG. 1 is a partial side view of a diopter adjustment 100 for a viewing optic showing the eyepiece 10 and scope tube 20. The eyepiece 10 and scope tube 20 are generally cylindrical with a central opening. The eyepiece 10 and scope tube 20 are coaxial. The eyepiece 10 has an internal surface having a first male thread 15. The scope tube 20 has an outer surface with a first female thread 30 which corresponds to the first male thread 15. The first male thread 15 engages the first female thread 30, resulting in the eye piece 10 being rotatable around and movable along the scope tube 20. The eyepiece 10 will move further onto the scope tube 20 further away from the rest of the viewing optic (not shown) depending on the direction of rotation.

Figure 2:
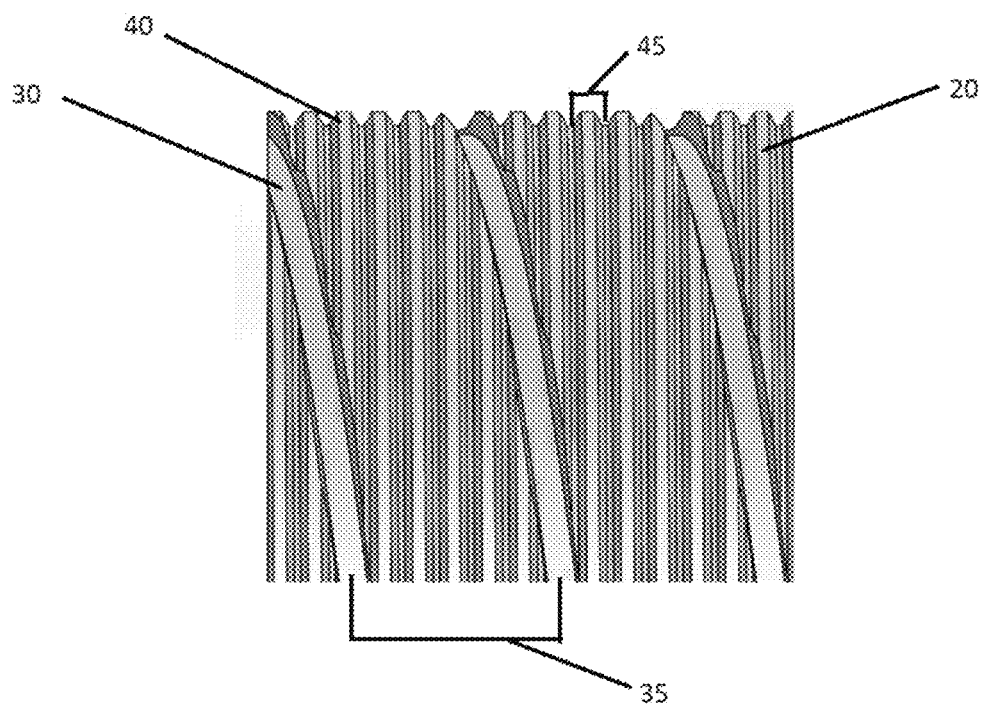
FIG. 2 is a close-up of the first female thread and second female thread of a scope tube in accordance with embodiments of the present disclosure.
Figure 3:
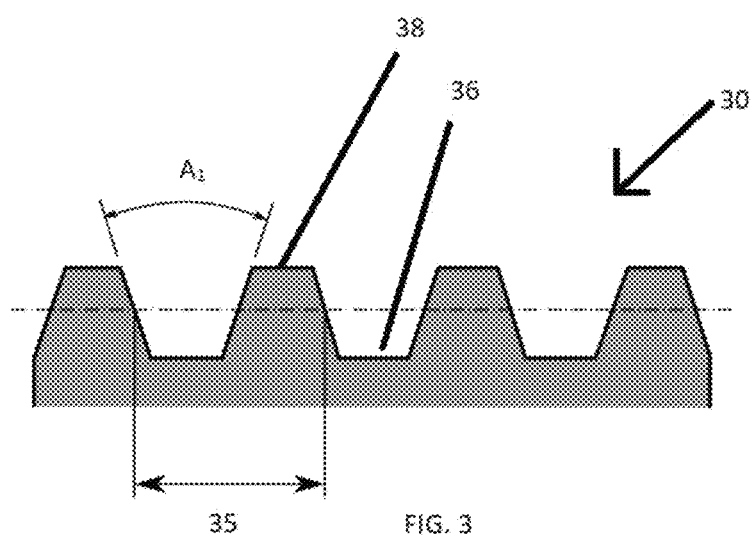
FIG. 3 is a schematic of a first female thread in accordance with embodiments of the present disclosure.

As shown more clearly in FIGS. 2 and 3, the first female thread 30 has single trapezoidal valley 36 spiraling around the scope tube 20. In an embodiment, the first female thread 30 has a pitch 35 from 3.0 mm, or 3.25 mm, or 3.5 mm, or 3.75 mm, or 4.0 mm, or 4.25 mm, or 4.50 mm to 4.75 mm, or 5.0 mm, or 5.25 mm, or 5.5 mm, or 5.75 mm, or 6.0 mm. In a further embodiment, the first female thread 30 has a pitch 35 from 4.0 mm, or 4.25 mm, or 4.5 mm to 4.75 mm, or 5.0 mm.

In an embodiment, the first female thread 30 is trapezoidal, meaning the cross-sectional view of the thread has a generally trapezoidal shape. In an embodiment, the thread angle $A_1$ is from 20°, or 25°, or 30° to 35°, or 40°, or 45°. In a further embodiment, the thread angle $A_1$ is from 25°, or 26°, or 27°, or 28°, or 29° to 30°, or 31°, or 32°, or 33°, or 34°, or 35°.

Figure 4:
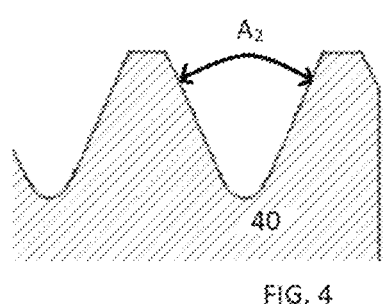
FIG. 4 is a schematic of a second female thread in accordance with embodiments of the present disclosure.

Referring to FIGS. 2 and 4, a second female thread 40 is provided on the lands 38 of the first female thread 30. As shown in FIGS. 1 and 2, the pitch 35 of the first female thread 30 is greater than the pitch 45 of the second female thread 40. In an embodiment, the pitch 35 of the first female thread 30 is from 2×, or 2.5×, or 3×, or 3.5× to 4×, or 4.5×, or 5× the pitch 45 of the second female thread 40. In a further embodiment, the pitch 35 of the first female thread 30 is from 2.5×, or 2.75×, or 3.0×, or 3.25×, or 3.5×, or 3.75× to 4.0×, or 4.25×, or 4.5×, or 4.75×, or 5.0× the pitch 45 of the second thread 40.

In an embodiment, the pitch 45 of the second female thread 40 is from 0.25 mm, or 0.5 mm, or 0.75 mm, or 1.0 mm to 1.25 mm, or 1.5 mm, or 1.75 mm, or 2.0 mm, or 2.25 mm, or 2.5 mm. In a further embodiment, the second female thread 40 has a pitch 45 from 0.3 mm, or 0.4 mm, or 0.5 mm, or 0.6 mm, or 0.7 mm to 0.8 mm, or 0.9 mm, or 1.0 mm, or 1.1. mm, or 1.2 mm, or 1.3 mm, or 1.4. mm, or 1.5 mm.

In an embodiment, the second female thread 40 is a standard V-thread profile consistent with ISO 261 and Unified Thread Standard. The thread angle $A_2$ is from 40°, or 45°, or 50°, or 55°, or 60° to 65°, or 70°, or 75°, or 80°. In a further embodiment the thread angle $A_2$ is from 55°, or 56°, or 57°, or 58°, or 59° to 60°, or 61°, or 62°, or 63°, or 64°, or 65°.

Referring again to FIG. 1, a jam nut 50 is a generally ring-shaped component having an inner surface having a second male thread (not shown) corresponding to the second female thread 40. The jam nut 50 is coaxial with the eyepiece 10 and the scope tube 20. The second male thread engages the second female thread 40 of the scope tube 20, resulting in the jam nut 50 being rotatable about and movable along the scope tube 20.

To adjust the focus of the eyepiece 10, the eyepiece 10 is first rotated (i.e., rotated either clockwise or counterclockwise depending on the desired adjustment) until the user determines the view is clear. The jam nut 50 is then rotated until it is snuggly secured against the eyepiece 10. The jam nut 50 acts as a lock. The fine pitch 45 of the second female thread 40 relative to the large pitch 35 of the first female thread 30 impedes the jam nut's 50 inadvertent movement when a viewing optic is moved, jostled or in use. For example, in an embodiment, the viewing optic is a scope for use with a firearm. The locking ability of the jam nut 50 prevents the eyepiece 10 from moving when the firearm is fired.

It will be appreciated that the diopter adjustment mechanism may be used in association with any viewing optic, including but not limited to, a scope, a rifle scope, binoculars, camera, telescope, and similar viewing optics.

While multiple embodiments of the diopter adjustment mechanism features have been described in detail, it should be apparent that modifications and variations thereto are possible, all of which fall within the true spirit and scope of the invention. With respect to the above description then, it is to be realized that the optimum dimensional relation ships for the parts of the disclosed technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A diopter adjustment mechanism comprising:
   a scope tube;
   a first female thread having a first pitch disposed on the scope tube forming spiral threads and lands between the spiral threads;
   a second female thread having a second pitch and disposed on the lands of the first female thread, wherein the first pitch is from 3.0 mm to 6.0 mm and wherein the second pitch is from 0.25 mm to 2.5 mm; and
   a jam nut having a male thread corresponding to and engaging the second female thread,
   wherein the first pitch is greater than the second pitch.

2. The diopter adjustment mechanism of claim 1, wherein the first female thread is trapezoidal.

3. The diopter adjustment mechanism of claim 1, wherein the second female thread has a V-thread profile.

4. The diopter adjustment mechanism of claim 1, of the first female thread has a thread angle from 20° to 45°.

5. The diopter adjustment mechanism of claim 1, wherein the second female thread has a thread angle from 40° to 80°.

6. A viewing optic comprising:
   an eyepiece having an inner surface having a first male thread;
   a scope tube having an outer surface with a first female thread and a second female thread, the first female thread having a first pitch and lands and the second female thread having a second pitch and disposed on the lands, wherein the first pitch is from 2.5× to 5× the second pitch; and
   a jam nut rotationally secured to the outer surface of the scope tube and having a second male thread on an inner surface,
   wherein the first pitch is greater than the second pitch,
   wherein the first male thread corresponds to the first female thread, and
   wherein the second male thread corresponds to the second female thread.

7. The viewing optic of claim 6, wherein the first female thread is trapezoidal.

8. The viewing optic of claim 6, wherein the second female thread has a V-thread profile.

9. The viewing optic of claim 6, wherein the first female thread has a thread angle from 20° to 45°.

10. The viewing optic of claim 6, wherein the second female thread has a thread angle from 40° to 80°.

11. The viewing optic of claim 6, wherein the viewing optic is selected from a scope, a rifle scope, binoculars, a camera, and a telescope.

12. The viewing optic of claim 6, which is adapted for use with a firearm.

* * * * *